UNITED STATES PATENT OFFICE.

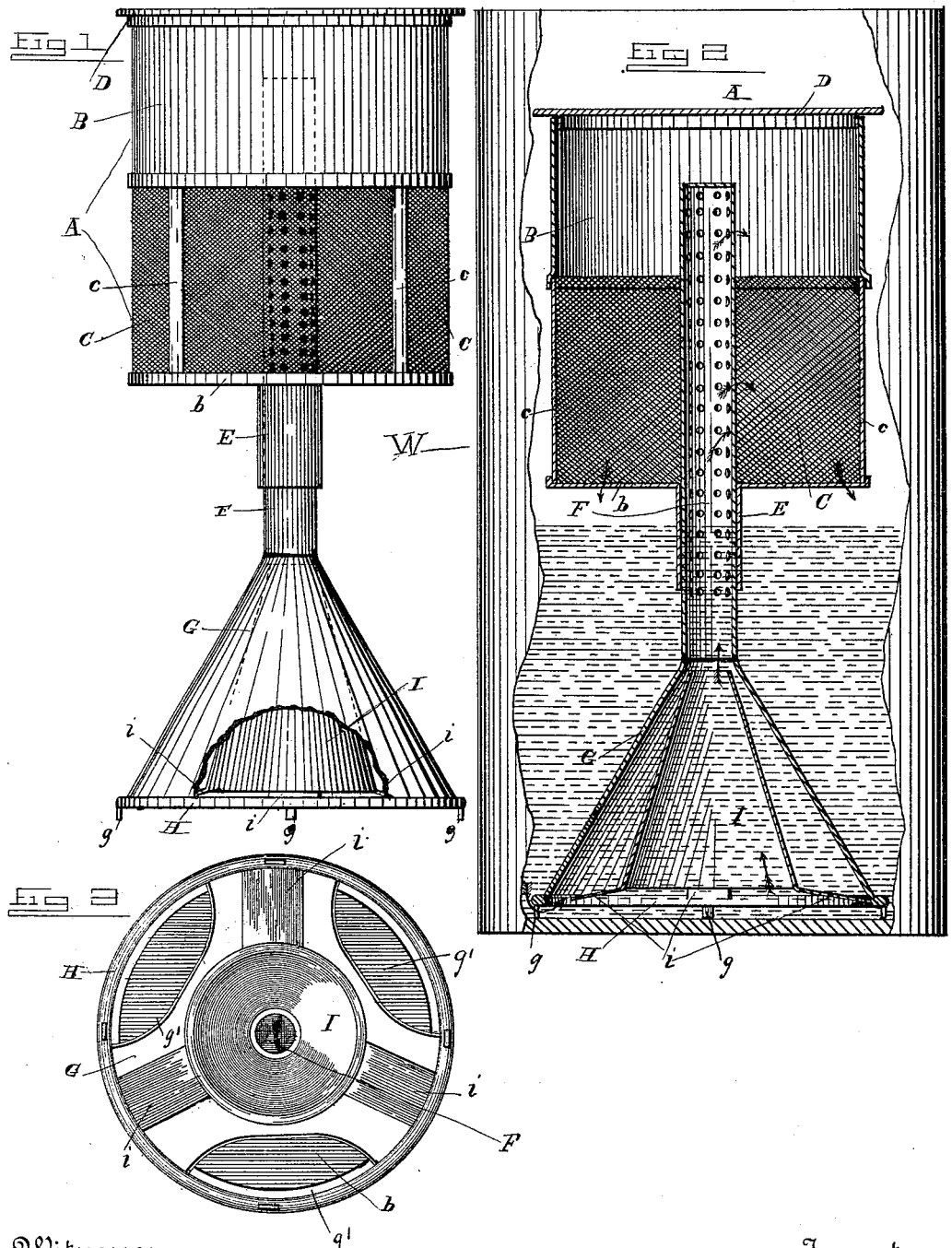

PAUL BULOW, OF CAIN, KANSAS.

COFFEE-BOILER.

SPECIFICATION forming part of Letters Patent No. 405,946, dated June 25, 1889.

Application filed February 9, 1889. Serial No. 299,284. (No model.)

*To all whom it may concern:*

Be it known that I, PAUL BULOW, of Cain, in the county of Rice and State of Kansas, have invented certain new and useful Improvements in Coffee-Boilers; and I do hereby declare that the following is a full, clear, and exact description thereof, reference being had to the accompanying drawings, and to the letters of reference marked thereon, which form part of this specification, in which—

Figure 1 is a side view of my improved device for use with coffee and tea boilers, &c. Fig. 2 is a sectional view of the same in position within a boiler. Fig. 3 is a bottom view of the same.

This invention is an improved device for steaming coffee, tea, and other vegetable products or berries to extract the juices or flavors therefrom; and it consists in a novel device or utensil to be used within a closed vessel or ordinary kitchen-boiler, and in the novel construction and arrangement of parts of said utensil, as is hereinafter clearly set forth.

Referring by letter to the drawings, A designates a cylindrical or other convenient shaped cup formed of a ring B, which is supported on a bottom piece $b$ by legs $c\ c$, and C is a ring of reticulated metal or wire-gauze, attached at its upper edge to the lower edge of ring B and at its lower edge to bottom $b$. This cup is closed by a cover D, which fits tightly upon ring B. Bottom $b$ is perforated centrally, and surrounding the perforation is a sleeve E, through which projects tube F, which is closed at its upper end, but which is numerously perforated in the portion of it which extends above bottom $b$, as shown. This tube is supported on a conical base G, the open lower end of the tube being connected to the open upper end of the base, and the latter has short feet or lugs $g\ g$ on its lower edge, and is strengthened by a bottom ring H, as shown. I represents a conical tube open at both ends and secured centrally within base G, small end uppermost, being supported by radial stays $i$, attached to its lower edge and to the lower edge of base G, but so inclined that cone I is held out of contact with the support on which base G stands. The upper end of tube I lies close to the lower end of tube F, but not in contact therewith, so that fluid rising between cone I and base G can enter the tube.

In use the cup A is filled partly or wholly with coffee or other articles or substances from which the essence or aroma is to be extracted. Tube F is then adjusted in the cup so that some of its perforations will be above the bottom $b$. The utensil is then placed within a boiler or suitable closed vessel W, being supported therein on base G, and water is poured into the vessel until the lower end of sleeve E is covered, but preferably not sufficient to reach the bottom of the cup. When the water is made to boil, the steam generated under the base G will be directed thereby into tube F, while cone I will concentrate and direct the steam and water globules into said tube. The steam rises therethrough to the end of the tube and jets therefrom into cup A, permeating the substance therein and extracting its flavor. As the ebullition of the water increases, water will follow the steam up through tube F into cup A, from whence it and the steam escapes through the gauze ring, carrying off the extracted essence of the substance in the cup, while the ring prevents the grounds or material portions of the substance escaping therewith, and the fluid in the boiler can be withdrawn in a pure condition.

The cone I, arranged in cone or base G, as described and shown, forms therewith an ejecting device, the steam rising through cone I being concentrated, and escapes more forcibly from its upper end, creating a forced current upward through tube F, by which current water and steam is sucked up from and through base G, as indicated by the arrows. The double cones thus materially aid in giving a partial mechanical circulation to the steam and water. The cup can be adjusted readily on the tube to suit various depths of boilers or of water therein. The sleeve E assists in preventing the escape of steam from the tube between the surface of the water and bottom of the cup.

Instead of mounting base G on feet, as shown in Figs. 1 and 2, notches $g'$ might be made in the lower edge thereof, as in Fig. 3; but I prefer using the feet $g$ and not notching the base, as it will take but very little water to steam the coffee, as steam cannot escape from the base until the water-level is below its bottom.

Having thus described my invention, what I claim is—

1. The combination, with the cup having a cover and perforated sides, of a tube entering the body of the cup and adjustable therein, said tube being partially perforated, and the conical base supporting the lower end of the tube, and the cone secured within said base and opening into the tube, substantially as and for the purpose specified.

2. The combination of the boiler with a cup therein having a cover and perforated sides and an opening in its bottom surrounded by a depending sleeve, an adjustable tube having a perforated end extending through said sleeve and entering the cup, and a conical base supporting said tube, and a cone secured within said base and open at its upper end below the tube, all substantially as described.

3. The combination of the cup A, consisting of top ring B and bottom b, connected by legs c, a perforated ring C, and the cover D, with the adjustable tube supporting said cup and perforated, as described, the conical base supporting said tube, and the cone within said base, all substantially as set forth.

4. The herein-described utensil, consisting of a perforated tube F, a conical base G, having feet g, supporting said tube, a cone I, supported in said base by stays i, with the cup A, formed of a top ring B, a lower perforated ring C, a bottom b, having a central opening, a sleeve E, surrounding said opening and through which the upper end of tube F passes, and the cover D thereof, all substantially as and for the purpose described.

In testimony that I claim the foregoing as my own I affix my signature in presence of two witnesses.

PAUL BULOW.

Witnesses:
GEORGE CRAMM,
GEO. T. HAUSER.